United States Patent [19]
Yamada

[11] Patent Number: 6,053,051
[45] Date of Patent: *Apr. 25, 2000

[54] COMPRESSIVE FORCE DETECTING SENSOR

[75] Inventor: Yoshiharu Yamada, Tokyo, Japan

[73] Assignee: Kabushiki Kaisha Tokyo Sensor, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/016,415

[22] Filed: Jan. 30, 1998

[30]     Foreign Application Priority Data

May 29, 1997 [JP] Japan .................................. 9-140126

[51] Int. Cl.[7] ..................................................... G01B 7/16
[52] U.S. Cl. ..................................... 73/777; 73/862.625
[58] Field of Search ..................... 73/790, 777, 862.621, 73/862.625, 862.632

[56]     References Cited

U.S. PATENT DOCUMENTS

| | | | |
|---|---|---|---|
| 4,503,705 | 3/1985 | Polchaninoff | 73/862.625 |
| 4,719,538 | 1/1988 | Cox | 361/283 |
| 5,209,119 | 5/1993 | Polla et al. | 73/862.625 |
| 5,398,962 | 3/1995 | Kropp | 280/731 |
| 5,629,488 | 5/1997 | Kropp | 73/862.625 |

FOREIGN PATENT DOCUMENTS 7-31513   6/1995   Japan .

*Primary Examiner*—Max Noori
*Attorney, Agent, or Firm*—Armstrong, Westerman Hattori, McLeland & Naughton

[57]     ABSTRACT

It is possible to detect the compressive force being applied by means of the conventional compressive force detecting sensor. However, the time length and the magnitude of the compressive force fail to be detected and it is impossible to know the extent of damage as a result of the compressive force being applied. For solution of this problem, the compressive force detecting sensor of the invention includes a tape switch composed of a pair of belt-like electrode plates arranged in facing relation to each other with a predetermined spacing therebetween, said tape switch being covered with a pliable covering member therearound; a piezoelectric sensor having a cable or a film like shape laminated on said tape switch; and an outer shell of pliable material to cover said tape switch and said piezoelectric sensor.

3 Claims, 3 Drawing Sheets

6,053,051

COMPRESSIVE FORCE DETECTING SENSOR

BACKGROUND OF THE INVENTION

The present invention relates to a compressive force detecting sensor which is capable of detecting a compressive force at the time of physical contact with an object or a compressive force which is experieced at the time of said sensor being pinched by such object, sending an output for eliminate the compressive force while measuring the length of time during which the compressive force is applied and the magnitude thereof.

Conventionally, transporting vehicles which automatically run on the premises of a factory are installed with a compressive force detecting sensor in a bumper thereof for stopping such a vehicle the moment it collides with a person or an object and the assignee of the instant applicantion applied for patent for such invnetion and was granted with a patent in Japan.

The sensor is structured such that a pair of belt-like electrode plates are arranged in facing relation to each other with a predetermined spacing therebetween to form a belt-like tape switch. Said tape switch is accommodated in a sponge attached within the bumper and is adapted to stop the motion of the vehicle by use of a compressive force or impact at the time of its collision with a person or an object by switching on or off to bring said pair of electrode plates into contact with each other.

In the conventional compressive force detecting sensor as described in the foregoing, it is possible to detect the compressive force but not the length of time during which the compressive force is being exerted and the magnitude thereof Therefore, it is not possible to know the extent of damage resulting from the application of the compressive force.

The object of the present invention is to solve the problem as described in the foregoing and provide a compressive force detecting sensor which is capable of sending an output signal indicating the application of a compressive force and additional output signals which send the time period during which the compressive force lasts and the magnitude thereof by combining the tape swithch and the pressure responsive sensor.

In order to accomplish the above mentioned object, the compressive force detecting sensor of the invention has as a means a tape switch composed of a pair of belt-like electrode plates arranged in facing relation to each other with a predetermined spacing therebetween, said tape switch being covered with a pliable covering member therearound; a piezoelectric sensor having a cable or film-like shape laminated on said tape switch; and an outer shell of pliable material covering said tape switch and said piezoelectric sensor.

It is also preferable to further provide a mounting base for mounting said compressive force detecting sensor with said outer shell being nested thereon and it is further preferable to provide said mounting base with a ridge in a contact surface thereon for said piezoelectric sensor.

DETAILED DESCRIPTION OF AN EMBODIMENT

Hereinafter, the compressive force detecting sensor will be explained with reference to the drawings.

Figure 1:
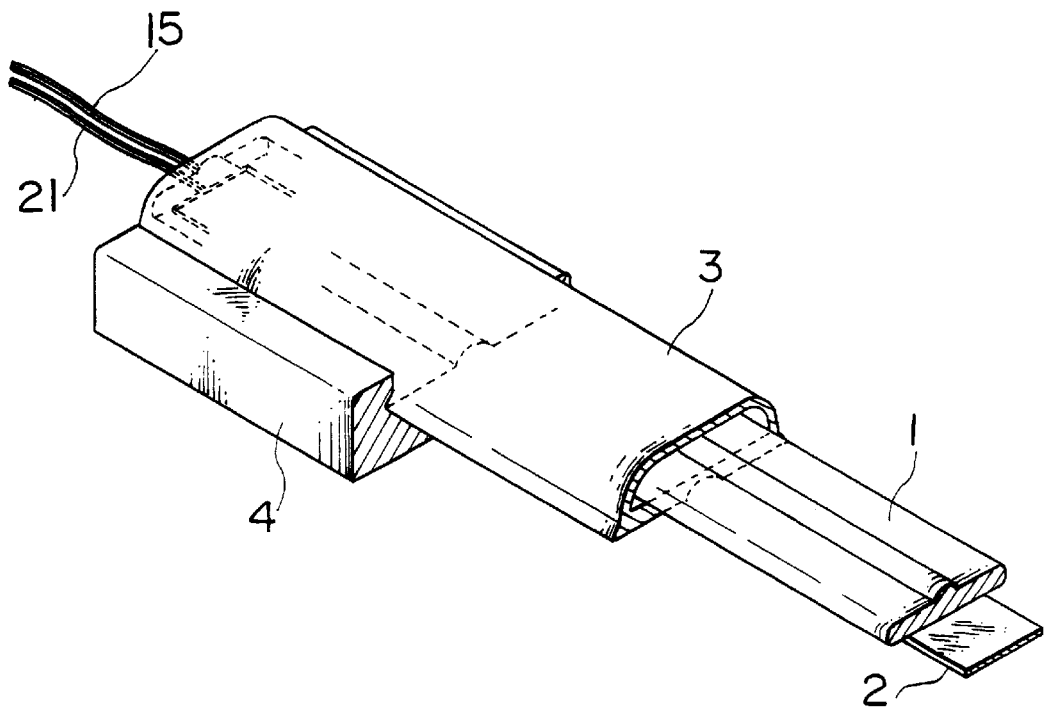
FIG. 1 is a partly broken perspective view of the compressive force detecting sensor according to the present invention.
Figure 2:
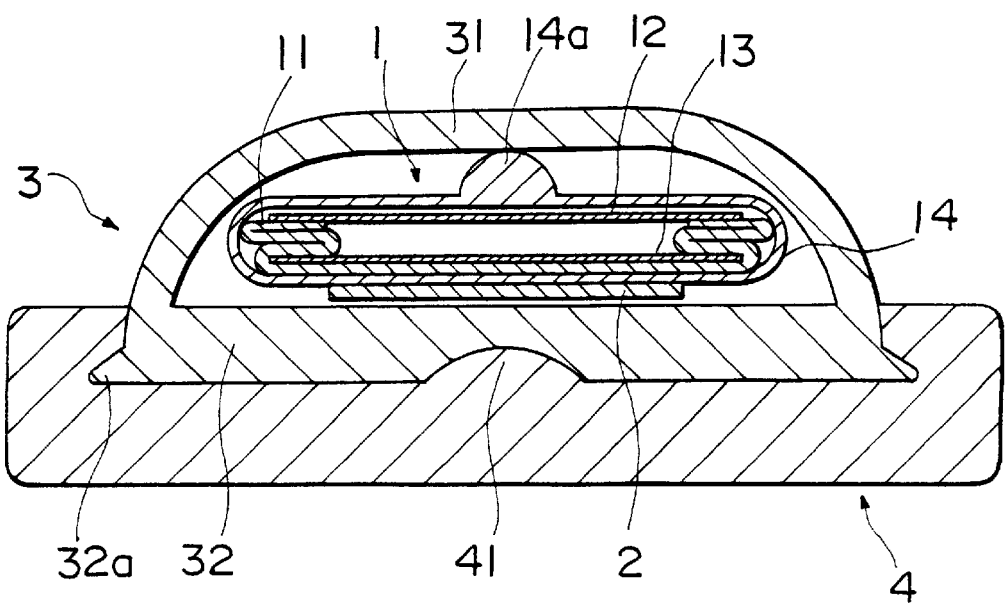
FIG. 2 is a cross sectional view of FIG. 1.

In FIGS. 1 and 2, the tape switch 1 is composed of a pair of electrode plates 12 and 13 arranged in facing relation to each other in a state in which said electrode plates 12 and 13 are insulated from each other by an insulating member 11 pliable in a longitudinal direction. Said tape switch 1 is covered by a covering member 14 of a pliable insulating material and said covering member 14 is formed with a ridge 14a extending in a longitudinal direction on one side thereof. A lead 15 is connected to the respective ends of said electrode plates 12 and 13.

On the reverse side of said tape switch 1 is laminated a cable or film-shaped piezoelectric sensor 2 to extend longitudinally. In this connection, a lead 21 is connected to said piezoelectic sensor 2. Further, an outer shell 3 of pliable material such as rubber covers the whole structure of said tape switch 1 and piezoelectric sensor 2 laminated one on the other and has a curved face 31 on the upper side and a flat face 32 on the lower side.

There is formed on the flat face 32 of said outer shell 3 a flange portion 32a to project laterally outwardly. A mounting base 4 of rubber or synthetic resin material is provided to pinch said flange portion 32a projecting laterally outwardly from both sides of the flat surface 32 of said outer shell 3 such that said outer shell 3 is nested on the mounting base 4. Further, said mounting base 4 is formed with a ridge 41 in a contact surface thereof to extend longitudinally in a position facing the piezoelectric sensor 2 by way of the lower side of the shell.

Figure 3:
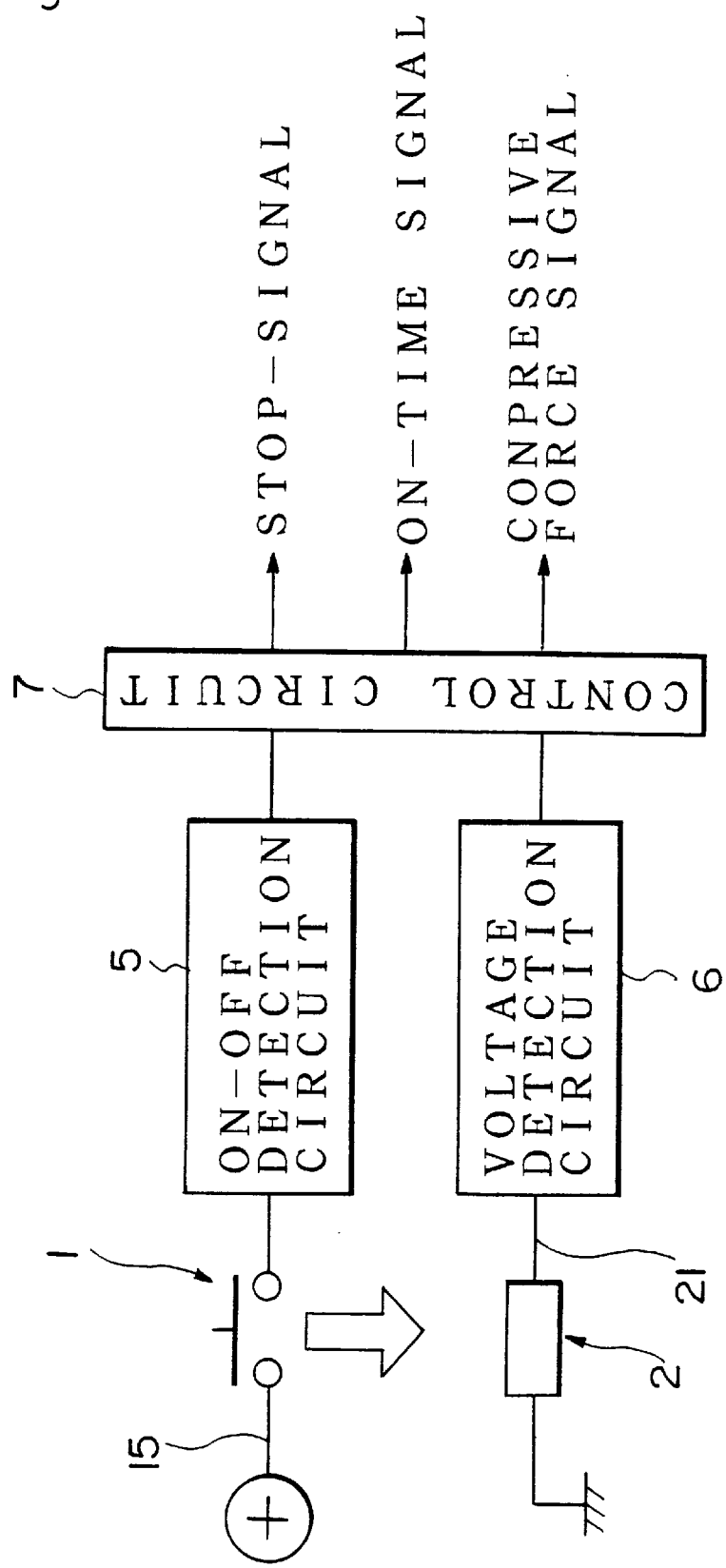
FIG. 3 is a block diagram showing the various outputted value measured by the compressive force detecting sensor.

Next, a further explanation will be given with reference to the block diagram of FIG. 3. In this connection, since similar numerals and characters denote similar members to those used in the foregoing, an explanation therefor will be omitted.

An ON-OFF detector circuit 5 is connected to the lead 15 of the tape switch 1 to issue an ON-OFF signal to indicate that said electrode plates 12 and 13 has come into or gone out of contact with each other. Further, a voltage detecting circuit 6 is provided to detect a voltage established as said piezoelectric sensor 2 is pressed against.

With a signal from said ON-OFF detection circuit 5 being inputted, a control circuit 7 issues a stop signal to stop an automatically running transporting vehicle and with a signal from the volatage being inputted, an on-time signal indicating the length of time during which the detected votage lasts while a compressive force signal indicaating the magnitude of said detected voltage is issued.

Next, the operation of the invention will be explained on the basis of the above described structure. If, for example, a man or an object collides with an automatically running transportation vehicle's bumper incorporated with the compressive force detecting sensor, the compressive force at that time works on the tape switch 1 to bring the two electrode plates 12 and 13 into contact with each other.

This state is detected by the ON-OFF detection circuit 5 such that a stop signal is issued for stopping the vehicle by way of the control circuit 7 and as a result, the vehicle is stopped. The compressive force against the tape switch 1 also works on the piezoelectric sensor 2 by way of said tape switch 1, thus causing the piezoelectric sensor to establish a voltage.

Figure 4:
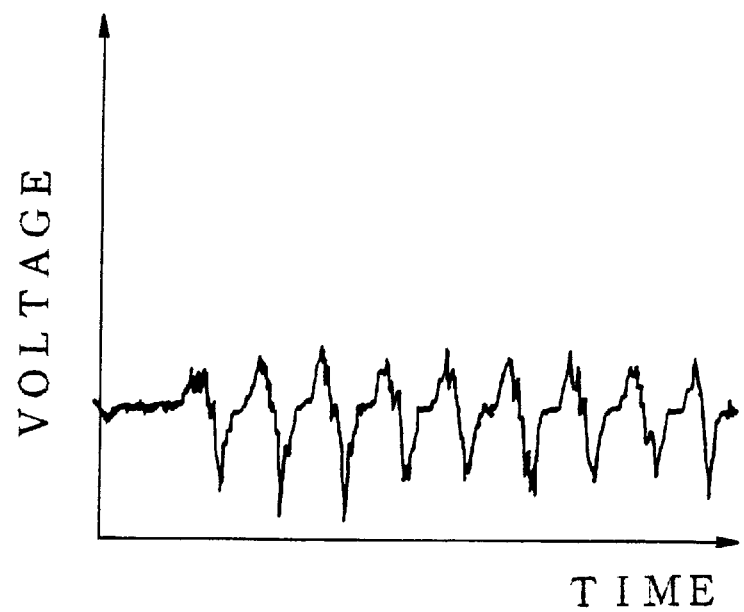
FIG. 4 is a characteristic view showing the time length during which the compressive force is being applied.
Figure 5:
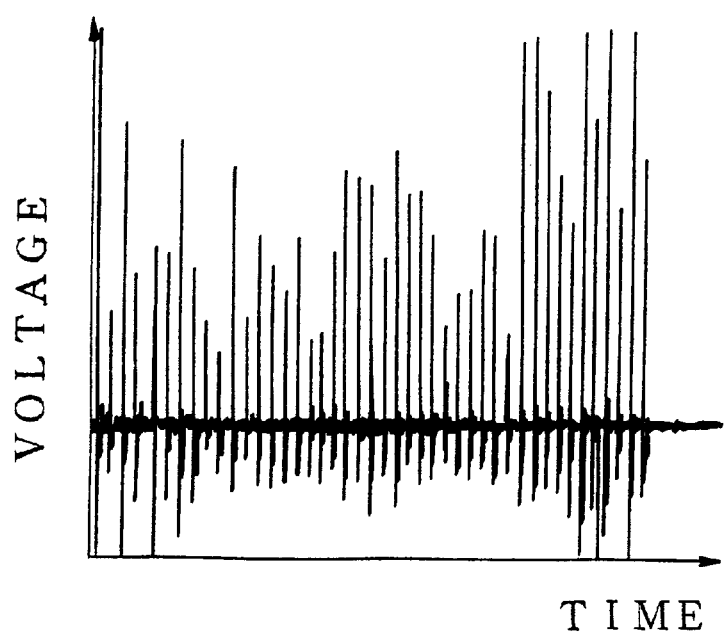
FIG. 5 is a characteristice view showing the magnitude of the compressive force.

Said voltage is detected by the voltage detecting circuit 6 such that a compressive force signal or the output issued in proportion to said established voltage is recorded in a computer by way of the control circuit 7 or a characteristic diagram is shown as in FIG. 4 and FIG. 5 by way of the recording device. In other words, when said compressive force is applied intermittently, the time length during which the compressive force is being applied is extracted as shown in FIG. 4 and the magniture of the compressive force signifying the voltage is extracted as shown in FIG. 5.

Therefore, the compressive force detecting sensor of the present invention not only detects information as to whether or not the compressive force is present but also the frequency and the time length of the compressive force being applied and the magnitude thereof. Therefore, besides being incorporated into the bumper of said automatically running vehicle, the sensor also has an application to a measuring instrument in testing devices for conducting durability tests of materials in which the strength of compressive forces is measured.

Further, by providing a ridge 41 in the mounting base 4, a compressive force is locally applied against the piezoelectric sensor 2 by said ridge 41 as the piezoelectric sensor is pressed by way of the tape switch 1, thus elevating the sensibility of the sensor 2.

As detailed in the foregoing, the tape switch and the piezoelectric sensor are combined such that the resulting compressive force not only causes the tape switch to be turned on, detecting that the pressure force is applied but also causes the tape switch to measure the length of time during which the compressive force is being applied and the magnitude of the compressive force by means of the output from the piezoelectric force because the piezoelectric sensor is pressed by way of the tape switch.

Further, the combined tape switch and piezoelectric sensor is attached to a mounting base with a ridge being formed on said mounting base at a portion in facing relation to said piezoelectric sensor such that the sensibility of the piezoelectric sensor is improved, thus making it possible to measure the time length and the magnitude of compressive force during which the compressive force is applied no matter how weak it may be.

What is claimed is:

1. A compressive force detecting sensor comprising:

a tape switch comprising a pair of electrode plates facing each other with a spacing therebetween;

a pliable covering member covering said tape switch;

a piezoelectric sensor having a cable or film shape laminated on said tape switch; and an outer shell of pliable material covering said pliable covering member and said piezoelectric sensor.

2. The compressive force detecting sensor according to claim 1, further including a mounting base to mount said outer shell thereon.

3. The compressive force detecting sensor according to claim 2, wherein said mounting base includes a ridge on a contact surface in a position facing said piezoelectric sensor.

* * * * *